April 23, 1963 E. COUSINS Re. 25,374

WIRE TRACTION INSERT FOR TIRES

Original Filed Nov. 5, 1959

INVENTOR.
EDWARD COUSINS

BY

J. B. Holden
ATTORNEY

United States Patent Office

Re. 25,374
Reissued Apr. 23, 1963

25,374

WIRE TRACTION INSERT FOR TIRES

Edward Cousins, Akron, Ohio, assignor to The Goodyear Tire & Rubber Company, Akron, Ohio, a corporation of Ohio Original No. 3,003,534, dated Oct. 10, 1961, Ser. No. 851,094, Nov. 5, 1959. Application for reissue Nov. 5, 1962, Ser. No. 235,926
8 Claims. (Cl. 152—211)

Matter enclosed in heavy brackets [ ] appears in the original patent but forms no part of this reissue specification; matter printed in italics indicates the additions made by reissue.

This invention relates to metal anti-skid or traction augmenting members or inserts adapted to be embedded in rubber traction members, and more particularly, but not exclusively, to such inserts adapted to be embedded in vehicle tires.

Various types of tire traction inserts have been proposed including elongated wire coils, wire mesh, or isolated individual traction elements embedded into the rubber. of the tread surface of a vehicle tire or similar article. Although these traction inserts have contributed to increasing traction, each has disadvantages which makes the use thereof unfeasible. For example, wire coils require a certain "wearing in" before reaching peak road gripping efficiency and in addition, after the coil has been worn the remaining isolated U-shaped members tend to work out of the tread so that the anti-skid feature of the insert is lost. Furthermore, during the "wearing in" period the wire coil at the tread surface acts as a sled runner on ice and snow to both longitudinal and traverse sliding because the wires in each turn of the coil at the tread surface extends in the same direction and continuously for a considerable distance. This "sled runner" effect during the wearing-in period creates a very hazardous condition. Wire mesh, on the other hand, is a satisfactory anti-skid insert but it is particularly difficult to disperse the mesh uniformly throughout the depth of the tread. Obviously, individually spaced or isolated inserts require a considerable amount of labor to be incorporated into the tread and are subject to being thrown out of the tread due to centrifugal force.

It is an object of this invention to provide an improved anti-skid tire construction having metal traction augmenting inserts therein which provide a large number of traction agumenting points at the tread surface and which has substantially the same road gripping qualities during the entire useful life thereof.

Another object of the invention is to provide a non-skid tire construction in which metal traction augmenting members or inserts may be economically embedded in the tire tread during manufacture of the tire or during recapping of a used tire.

A further object of the invention is to provide a non-skid tire construction having traction augmenting inserts made of metal wire which have a plurality of substantial parallel teeth terminating at the tread surface of the tire, the teeth being interconnected or interlocked solely at the base thereof.

Referring to the drawings.

Figure 1:
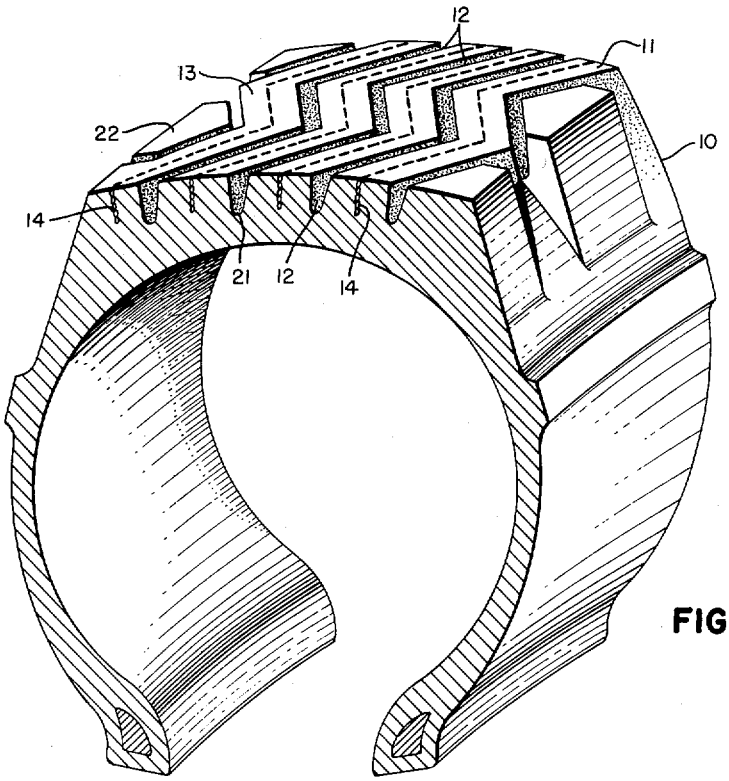
FIG. 1 is an isometric view of a tire with parts broken away and in cross section showing the preferred traction augmenting insert of the present invention embedded in the tread thereof.

Referring to the drawings, numeral 10 indicates a tire having a tread 11 which for the purpose of illustrating the invention is provided with a plurality of circumferentially extending grooves 12 forming intervening ribs 13. It is to be understood that the invention is applicable to a tire having any tread design as well as other articles having traction surfaces such as conveyor belts, shoes, mats and the like. The traction augmenting insert 14 is embedded in each of the ribs 13 so that the insert will be fully effective to increase traction of the tire on icy and wet pavements during the complete tread life of the tire. Preferably, the insert 14 has a width substantially the same as the depth of the grooves 12 and ribs 13 and extends both traversely and longitudinally relative to the ribs 13.

Figure 2:
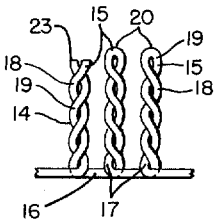
FIG. 2 is a fragmentary view of the traction insert shown in FIG. 1.

Referring to FIG. 2, the insert 14 is made of metal wire, preferably steel, and consists of a plurality of parallel teeth 15 integrally joined to a base or edge member 16 which extends from the base 17 of any given tooth to the base 17 of each adjoining or adjacent tooth. The teeth 15 extend normal to the base 16 and in the same plane as the base 16. Preferably, the teeth 15 extend from the base 16 a distance substantially equal to the depth of the grooves 12 of the tire as indicated above, so that the length of the teeth 15 is at least several times greater than the width of the base 16.

Referring further to FIG. 2, each of the teeth 15 are formed of at least two wires 18 and 19 which are twisted together forming several turns from the base 16 to the terminal end 20 of the teeth. Preferably, the insert is made of a single continuous strand of metal wire which forms both the base 16 and the teeth 15. In forming the insert 14 from a single strand, the strand is looped at closely spaced intervals and each of the loops is then twisted or turned upon itself so as to form a plurality of turns therein as shown in FIG. 2.

Figure 3:
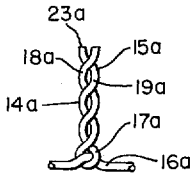
FIG. 3 is a fragmentary view of a modification of the traction insert of the present invention.

A modification of the present invention is shown in FIG. 3. The insert 14a is provided with a continuous base wire 16a around which are twisted a plurality of U-shaped wires forming teeth 15a having a base 17a looped around and tightly cinched to the base wire 16a at closely spaced intervals by twisting together the legs 18a and 19a. The modification shown in FIG. 3 is otherwise similar in construction and function to the insert shown in FIG. 2.

Figure 4:
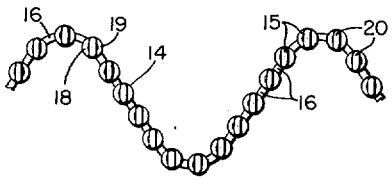
FIG. 4 is a fragmentary plan view of the traction insert shown in FIG. 2.

The inserts shown in FIGS. 2 and 3 are preferably bent traversely at longitudinally spaced locations so that the base 16 of the insert extends longitudinally in a sinuous or serpentine path as illustrated in FIGS. 1 and 4 to provide additional compressive strength during the tire molding operation and to provide additional traction longitudinally of the tread. The particular path of the insert is not critical so long as the insert extends both traversely and longitudinally of the tread 22 and preferably of both the tread and ribs 13. The insert 14 is embedded in the tread with the base 16 substantially in the same plane as the base 21 of the grooves 12 so that the teeth 15 extending normal thereto terminate substantially in the plane of the tread surface 22. During operation of the tire the terminal edge 20 of each tooth is rapidly worn off resulting in the exposure of a pair of endings 23 of the wires 18 and 19, as shown in FIG. 2. Obviously, the end 20 of the teeth may be mechanically removed either prior to or subsequent to embedding of the insert in the ribs 13.

It is desirable that the inserts 14 be adhered to the tread rubber so that they will be retained therein during the life of the tire. In addition to the mechanical lock due to flow of rubber into the slots between the teeth 15 and the spaces between the turns of the wires 18 and 19, the adhesion between the inserts and the tread rubber may be increased by coating the inserts with a suitable bonding agent, such as plasticized phenol formaldehyde, isocyanate resins, chlorinated rubber, or other well-known adhesives for bonding metals to rubber.

The inserts 14 are embedded into the tread 11 during the curing operation of new green tires or the curing or retreaded operation of camelback on used tires. The inserts 14 having a width and thickness as described above, and a circumferential length approximately equal to the length of the ribs 13, are placed within the tire curing matrix with the teeth 15 normal to the tread forming portion thereof. The insert 14 has sufficient flexibility to be formed into an arc or circle having a radius of curvature less than the standard size of passenger and truck tires. The inserts are held within the matrix by reason of the fact that they tend to return or spring back into a linear rather than an arcuate shape so that the inserts are frictionally held within the interior surface of the curing matrix. As the curing mold is closed, the inserts 14 have sufficient compressive strength to maintain their position normal to the tread forming portion of the matrix while the tread rubber is being forced radially into the tread forming portion of the matrix.

The tire 10 having inserts 14 of this invention embedded in the tread 11 exhibits very high resistance to skidding on icy and wet pavements due to the fact that a network of isolated wire edges is provided at the tread surface which resist skidding in both longitudinal and traverse directions relative to the tread. Since the inserts 14 of this invention are flexible in planes both parallel and normal to the tread surface, the inserts are free to move or flex with the tread rubber during operation of the tire and therefore do not interfere with the normal shape and movement of the tread due to the inflation pressure, load, speed, and passage through the road contact area. Furthermore, as the upper edge 20 of each of the teeth 15 is worn away the unitary construction of the insert 14 is retained. That is, each of the teeth 15 remains interconnected with adjacent teeth by reason of the base wire 16 which extends from the base 17 of each tooth 15 to the base of adjacent teeth and thus interlocks the teeth together. Obviously then, the teeth 15 are thereby mechanically locked in the tread surface for the complete life of the tread surface.

Although this invention has been described and illustrated by a tire having a plurality of circumferentially extending ribs, it is understood that the invention is not to be so limited and is applicable to a tire having a smooth tread surface with one or more inserts embedded therein, or to a tire having any conventional tread design including projections or ribs extending circumferentially and/or traversely of the tread surface.

While certain representative embodiments and details have been shown for the purpose of illustrating the invention, it will be apparent to those skilled in this art that various changes and modifications may be made therein without departing from the spirit or scope of the invention.

I claim:

1. In a tire, a rubber tread portion integral therewith having at least one anti-skid insert made of metal wire embedded in the rubber of said tread portion, said insert extending longitudinally and transversely of said tread portion, said insert having a width of substantially the same dimension as the thickness of the tread portion, said insert having a plurality of teeth projecting normal to and terminating at the tread surface, each tooth being formed of a loop of wire twisted upon itself for the length of each tooth, said teeth being inter-connected at the base of said insert by a base wire extending from the base of each tooth to the base of the adjacent teeth, whereby said teeth are maintained in interconnected relationship throughout the life thereof to prevent them from being thrown out of said tread.

2. A tire as claimed in claim 1 in which said base wire is integrally connected to said twisted wires forming adjacent teeth.

3. A tire as claimed in claim 1 in which said insert is made of at least one continuous strand of wire.

4. A tire as claimed in claim 1 in which the wires comprising said teeth terminate at the tread surface forming at least two wire endings.

5. In a tire, a rubber tread portion integral therewith having at least one anti-skid insert made of metal wire embedded in the tread portion, said insert having a plurality of spaced teeth projecting normal to said tread, each tooth being formed of a loop of wire twisted upon itself for the length of said tooth, the base of each tooth being connected to the base of the adjacent teeth by a base wire extending therebetween, said base wire being interlocked with the wire of adjacent teeth, whereby said teeth are maintained in interconnected relationship throughout the life thereof to prevent them from being thrown out of said tread.

6. A tire as claimed in claim 5 in which said base wire is continuous and said twisted wires forming the teeth are looped around and cinched to said base wire.

*7. In a tire, a rubber tread portion integral therewith, having at least one anti-skid insert made of metal wire embedded in the tread portion, said insert extending longitudinally and transversely of said tread portion, said insert having a width of substantially the same dimension as the thickness of the tread, said insert having at least one continuous base wire extending longitudinally of the insert and a plurality of spaced teeth projecting from said base wire and terminating at the tread surface, the base of said teeth being looped around and interlocked with said base wire, whereby said teeth are maintained in interlocked relationship throughout the life thereof to prevent them from being thrown out of said tread.*

*8. In a tire, a rubber tread portion integral therewith, having at least one anti-skid insert made of metal wire embedded in the tread portion, said insert extending longitudinally and transversely of said tread portion, said insert having a width of substantially the same dimension as the thickness of the tread, said insert having at least one base wire extending continuously longitudinally of the insert, said insert having a plurality of metal wire teeth secured to said base wire and forming a plurality of traction augmenting endings at the tread surface of the tire, each pair of said endings comprising the ends of a length of wire which is looped around and interlocked with said base wire, whereby said teeth are maintained for the complete life of the tread in interlocked relationship to prevent them from being thrown out of said tread.*

References Cited in the file of this patent or the original patent

UNITED STATES PATENTS

| | | |
|---|---|---|
| 1,878,679 | De Bruijn | Sept. 20, 1932 |
| 2,557,945 | Crooker | June 26, 1951 |
| 2,568,542 | Friestedt | Sept. 18, 1951 |